(12) United States Patent
Nakamura et al.

(10) Patent No.: US 7,679,214 B2
(45) Date of Patent: Mar. 16, 2010

(54) ELECTRONIC DEVICE INCORPORATING SYSTEM POWER SUPPLY UNIT AND METHOD FOR SUPPLYING POWER SUPPLY VOLTAGE

(75) Inventors: Toru Nakamura, Kasugai (JP); Hidekiyo Ozawa, Kasugai (JP)

(73) Assignee: Fujitsu Microelectronics Limited, Kanagawa (JP)

(*) Notice: Subject to any disclaimer, the term of this patent is extended or adjusted under 35 U.S.C. 154(b) by 373 days.

(21) Appl. No.: 11/512,334

(22) Filed: Aug. 30, 2006

(65) Prior Publication Data

US 2007/0226524 A1 Sep. 27, 2007

(30) Foreign Application Priority Data

Mar. 24, 2006 (JP) ............................. 2006-082836

(51) Int. Cl.
*H02J 3/14* (2006.01)
(52) U.S. Cl. ......................................... 307/38; 307/43
(58) Field of Classification Search ................... 307/38, 307/43
See application file for complete search history.

(56) References Cited

U.S. PATENT DOCUMENTS 6,459,175 B1 * 10/2002 Potega ........................ 307/149
7,242,111 B2 * 7/2007 Menas et al. .................. 307/38
7,395,442 B2 * 7/2008 Sekine et al. ............... 713/320

FOREIGN PATENT DOCUMENTS

| JP | 2000-228833 A | 8/2000 |
| KR | 10-2005-0044745 A | 5/2005 |
| WO | WO 2004/044718 A1 | 5/2004 |

* cited by examiner

*Primary Examiner*—Robert L. DeBeradinis
(74) *Attorney, Agent, or Firm*—Fujitsu Patent Center

(57) ABSTRACT

An electronic device provided with a system main unit including a load powered by operational voltage. A system power supply unit, connected to the system main unit, supplies the load with the operational voltage. The system main unit includes a memory circuit for storing initial value data containing a set value for setting the operational voltage of the load. A main unit communication circuit reads the initial value data from the memory circuit and transmits the initial value data to the system power supply unit. The system power supply unit includes a power supply communication circuit for communicating with the main unit communication circuit to receive the initial value data. A voltage generation circuit generates voltage corresponding to the set value.

24 Claims, 4 Drawing Sheets

ELECTRONIC DEVICE INCORPORATING SYSTEM POWER SUPPLY UNIT AND METHOD FOR SUPPLYING POWER SUPPLY VOLTAGE

CROSS-REFERENCE TO RELATED APPLICATIONS

This application is based upon and claims the benefit of priority from prior Japanese Patent Application No. 2006-082836, filed on Mar. 24, 2006, the entire contents of which are incorporated herein by reference.

BACKGROUND OF THE INVENTION

The present invention relates to an electronic device incorporating a system power supply unit and a method for generating and supplying power supply voltage.

A highly integrated semiconductor integrated circuit device (LSI) and an electronic system such as an electronic device is formed by a plurality of circuits and a plurality of devices having specific functions. An electronic system incorporates a system power supply unit for supplying power to each of a plurality of loads such as circuits and devices (refer to Japanese Laid-Open Patent Publication No. 2000-228833). The power supply voltages that are to be supplied to the loads may differ depending on the time or technology under which the loads were formed. Accordingly, there is a demand for a system power supply unit that generates a plurality of voltages corresponding to the loads and supplies each load with the appropriate voltage.

A system power supply unit in the prior art includes a plurality of DC-DC converters. Each DC-DC converter is set to generate voltage supplied to each circuit or device and output voltage that is controlled to be constant.

SUMMARY OF THE INVENTION

The threshold voltage or resistance value of each circuit and device may vary due to variations in the manufacturing process. This causes variations in the operational properties (e.g., operational speed) of each circuit and device. It is desired that such variations in operational properties be compensated for, or eliminated. In the system power supply unit of the prior art, the power supply voltage that is generated is set in advance, and the power supply voltage cannot be changed. Thus, with the system power supply unit of the prior art, the circuits and devices cannot be supplied with an adjusted power supply voltage in order to eliminate variations in the operational property and achieve the desired operational property.

One aspect of the present invention is an electronic device provided with a system main unit including a load powered by operational voltage. A system power supply unit, connected to the system main unit, supplies the load with the operational voltage. The system main unit includes a memory circuit for storing initial value data containing a set value for setting the operational voltage of the load. A main unit communication circuit reads the initial value data from the memory circuit and transmits the initial value data to the system power supply unit. The system power supply unit includes a power supply communication circuit for communicating with the main unit communication circuit to receive the initial value data. A voltage generation circuit generates voltage corresponding to the set value.

Another aspect of the present invention is a system power supply unit for use with a system main unit including a load and for supplying operational voltage to the load. The system main unit includes a memory circuit, for storing initial value data containing a set value representing the operational voltage of the load, and a main unit communication circuit, for reading the initial value data from the memory circuit and transmitting the initial value data. The system power supply unit includes a power supply communication circuit for communicating with the main unit communication circuit and receiving the initial value data. A voltage generation circuit generates voltage corresponding to the set value.

A further aspect of the present invention is a method for supplying one or more operational voltages from a system power supply unit to a load of a system main unit connected to the system power supply unit. The method includes storing initial value data, containing a set value representing an operational voltage of the load, in the system main unit. The method further includes providing the system power supply unit with the initial value data from the system main unit, and generating voltage with the system power supply unit in correspondence with the set value contained in the provided initial value data.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electronic device according to a preferred embodiment of the present invention will now be described with reference to FIGS. 1 to 3.

Figure 1:
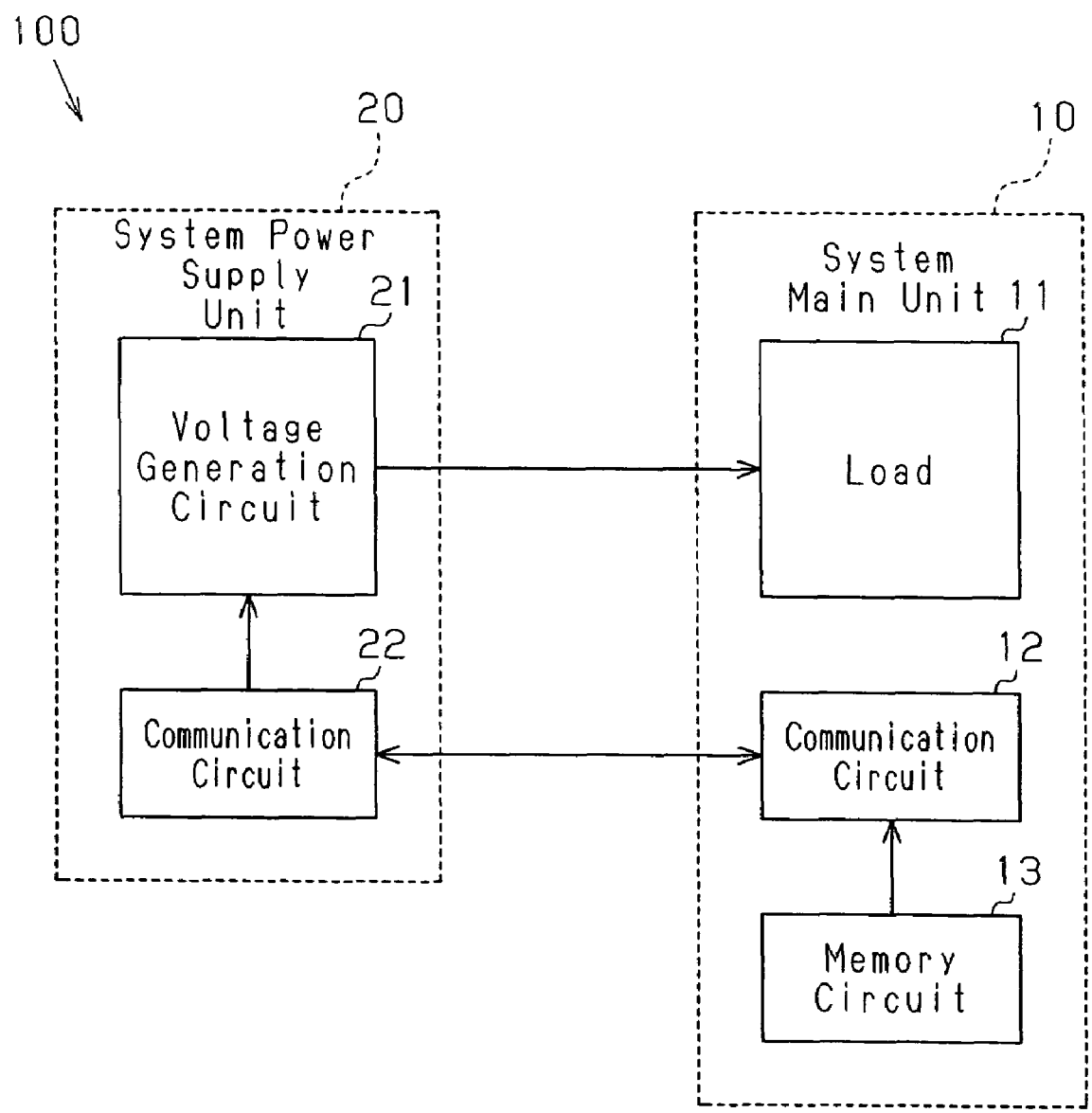
FIG. 1 is a block diagram of an electronic device according to a preferred embodiment of the present invention.

As shown in FIG. 1, the electronic device 100 includes a system main unit 10 and a system power supply unit 20. The system main unit 10 includes a load 11, a main unit communication circuit 12, and a memory circuit 13. The system power supply unit 20 includes a voltage generation circuit 21, which functions as a first voltage generation circuit or a load voltage generation circuit, and a power supply communication circuit 22.

The system power supply unit 20 supplies power supply voltages to the system main unit 10. The load 11 is powered by the power supply voltages. The load 11 includes, for example, logic circuits.

The main unit communication circuit 12 and the power supply communication circuit 22 communicate with each other. The main unit communication circuit 12 reads initial value data stored in the memory circuit 13 and transmits the initial value data to the power supply communication circuit 22 of the system power supply unit 20. The initial value data includes values of the power supply voltages corresponding to the load 11. The values of the power supply voltages are set so as to compensate for or eliminate variations in the operational properties (e.g., operational speed) of the load 11 resulting from processing variations during manufacturing. The values of the power supply voltages may be determined in advance through operational tests. The memory circuit 13 is, for example, a non-volatile memory.

The power supply communication circuit 22 sets the values of the power supply voltages supplied to the load 11 in accordance with the initial value data received from the main unit communication circuit 12. The voltage generation circuit 21 generates the power supply voltages of the set values. The voltage generation circuit 21 executes control for keeping the power supply voltage substantially constant.

In this manner, the system power supply unit 20 supplies the system main unit 10 with the power supply voltages corresponding to the initial value data of the system main unit 10. Therefore, the system power supply unit 20 generates the power supply voltage that is suitable for the system main unit 10 based on the initial value data held in the system main unit 10 even if system bodies 10 are manufactured with differences in operational properties (e.g., operational speed) due to processing variation during manufacturing. The system main unit 10 receiving that power supply voltage thus operates at a predetermined speed.

The initial value data is held in the system main unit 10. The system power supply unit 20 generates the power supply voltages corresponding to the system main unit 10 in accordance with the initial value data of the connected system main unit 10. Furthermore, when the system power supply unit 20 is connected to a different system main unit 10, the system power supply unit 20 generates the power supply voltages corresponding to that different system main unit 10. Thus, the system power supply unit 20 is versatile and may be commonly used for various system bodies 10. Further, the burden of setting and designing the system power supply unit 20 is reduced.

The system main unit 10 and the system power supply unit 20 will now be described in detail.

Figure 2:
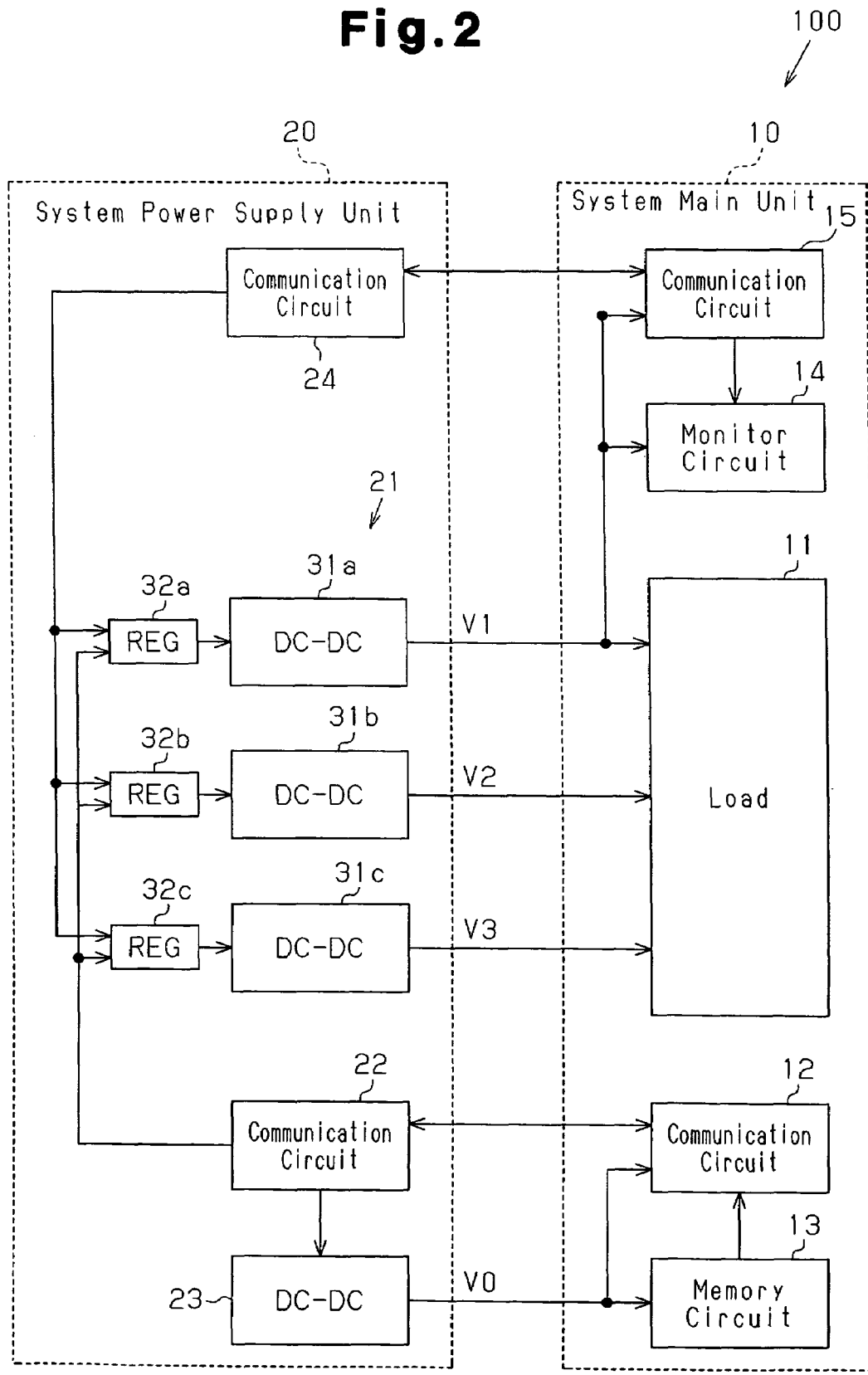
FIG. 2 is a partially enlarged block diagram of the electronic device of FIG. 1.
Figure 3:
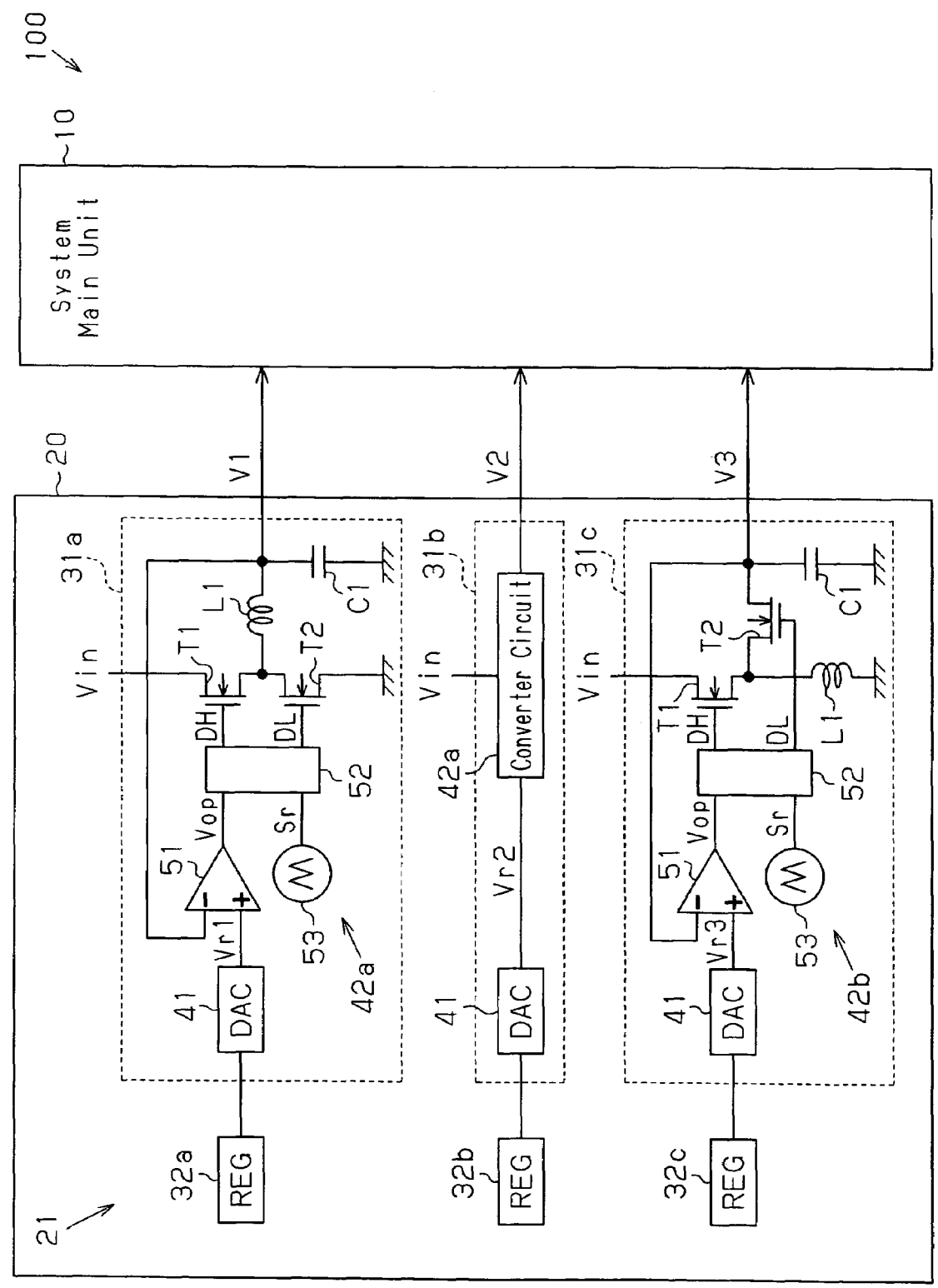
FIG. 3 is a block diagram of a voltage generation circuit.

As shown in FIG. 2, the system main unit 10 includes the load 11, first and second main unit communication circuits 12 and 15, the memory circuit 13, and a monitor circuit 14.

The system power supply unit 20 supplies a plurality of (three in FIG. 2) voltages V1, V2, and V3 to the load 11. The load 11 includes a plurality of circuits (not shown) powered by different power supply voltages. In a system LSI including, for example, a CPU and a peripheral circuit, the CPU and the peripheral circuit may operate at different operational voltages. In this case, operational voltages for the CPU and for the peripheral circuit are necessary. Furthermore, in an input/output circuit for exchanging signals with an IC connected to the system LSI, voltage of an external signal may differ from voltage of an internal signal. In such a case, each type of voltage becomes necessary.

In the preferred embodiment, the load 11 includes a first circuit operated by a first voltage V1, a second circuit operated by a second voltage V2, and a third circuit operated by a third voltage V3. The load 11 may include only a circuit that requires plural types of voltages.

Initial operational voltage V0 is supplied from the system power supply unit 20 to the first main unit communication circuit 12 and the memory circuit 13. The supply of the initial operational voltage V0 enables data to be read from the memory circuit 13. The first main unit communication circuit 12 is operated by the initial operational voltage V0 and transmits the initial value data read from the memory circuit 13 to the system power supply unit 20.

The initial value data contains the types (or number) of voltages necessary for the load 11 and the set values corresponding to the voltages. For the load 11, the initial value data contains information that the load 11 requires three types of voltages and three set values respectively corresponding to the voltages V1 to V3.

At least one (e.g., first voltage V1) of the plurality of power supply voltages supplied to the load 11 is supplied to the monitor circuit 14. The monitor circuit 14 measures an operational property of the load 11. The monitor circuit 14 includes, for example, a ring oscillator. The ring oscillator is configured by connecting an odd number of inverter circuits, operated by the first voltage V1, in a ring-like manner. The ring oscillator generates a pulse signal with a frequency determined by the operational property of each inverter circuit and the first voltage V1. Since each inverter circuit is manufactured simultaneously with the elements included in the load 11, the frequency of the pulse signal of the ring oscillator corresponds to the operational property of the load 11. The monitor circuit 14 measures the frequency of the pulse signal and generates a set value corresponding to the measured value. Furthermore, the monitor circuit 14 generates the set values for the other voltages V2 and V3 supplied to the load 11 based on the set value corresponding to the first voltage V1. By controlling the voltages V1 to V3 based on the set values, variations in the operational property of the load 11 are compensated for or eliminated.

The monitor circuit 14 generates the set data containing the set value of each voltage. The first voltage V1 is supplied to the second main unit communication circuit 15. The second main unit communication circuit 15 is operated by the first voltage V1, reads the set data generated by the monitor circuit 14, and transmits the set data to the system power supply unit 20.

The system power supply unit 20 includes the voltage generation circuit 21, first and second power supply communication circuits 22 and 24, and an initial operation DC-DC converter 23.

The voltage generation circuit 21 includes DC-DC converters 31$a$, 31$b$, and 31$c$ and registers 32$a$, 32$b$, and 32$c$. The quantities of the DC-DC converters 31$a$, 31$b$, and 31$c$ and the registers 32$a$, 32$b$, and 32$c$ correspond to the types (three in FIG. 2) of voltages supplied to the system main unit 10 (or the load 11). The first converter 31$a$ generates and outputs the first voltage V1 corresponding to the set value stored in the first register 32$a$. The second converter 31$b$ generates and outputs the second voltage V2 corresponding to the set value stored in the second register 32$b$. The third converter 31$c$ generates and outputs the third voltage V3 corresponding to the set value stored in the third register 32$c$.

The voltage generation circuit 21 will now be described with reference to FIG. 3.

The first converter 31$a$ includes a digital-analog converter (DAC) 41, which is connected to the first register 32$a$, and a converter circuit 42$a$, which is provided with the output signal of the DAC 41. The DAC 41 generates and outputs voltage (reference voltage) Vr1 corresponding to the set value stored in the first register 32$a$.

The converter circuit 42$a$ includes an error amplifier (ERA) 51, a PWM comparator 52, an oscillator (OSC) 53, transistors T1 and T2, a choke coil L1, and a smoothing capacitor C1. Reference voltage Vr1 is supplied from the DAC 41 to a non-inverting input terminal of the error amplifier 51. The first voltage V1 is supplied to the inverting input terminal of the error amplifier 51. The error amplifier 51 amplifies the difference between the reference voltage Vr1 and the first voltage V1 to generate an error signal Vop having the voltage obtained by amplifying the difference. The error signal Vop and a triangular wave signal Sr generated by the oscillator 53 are provided to the PWM comparator 52. The PWM comparator 52 compares the error signal Vop and the triangular wave signal Sr to output a first-control signal DH having a level corresponding to the comparison result and a second control signal DL having a level inverted from the level of the first control signal DH. For example, the PWM comparator 52 outputs the first control signal DH having an L level and the second control signal DL having of H level when the voltage of the error signal Vop is higher than the voltage of the triangular wave signal Sr. On the other hand, the PWM comparator 52 outputs the first control signal DH having an H level and the second control signal DL having an L level when the voltage of the error signal Vop is lower than the voltage of the triangular wave signal Sr. The first control signal DH is provided to the first transistor Ti, and the second control signal is provided to the second transistor T2.

The first transistor T1 and the second transistor T2 are N-channel MOS transistors. Input voltage Vin is applied to the drain of the first transistor T1. The source of the first transistor T1 is connected to the drain of the second transistor T2. The source of the second transistor T2 is connected to ground. The choke coil L1 has a first terminal, which is connected to a node between the first transistor T1 and the second transistor T2, and a second terminal (output terminal), which is connected to a first terminal of the capacitor C1 and the inverting input terminal of the error amplifier 51. The capacitor C1 has a second terminal of connected to ground. The second terminal of the choke coil L1 outputs the first voltage V1.

In the first converter 31a, the first transistor t1 is turned ON in response to the first control signal DH having an H level, and the second transistor T2 is turned OFF in response to the second control signal DL having an L level. In this case, the first voltage V1 increases. When the first transistor T1 is turned OFF in response to the first control signal DH having an L level, and the second transistor t2 is turned ON in response to the second control signal DL having an H level, the energy stored in the choke coil L1 is released. Decrease in the energy stored in the choke coil L1 lowers the first voltage V1. As the difference between the first voltage V1 and the reference voltage Vr1 increases, the first control signal DH having an H level is output and the first transistor T1 is turned ON.

As the first voltage V1 decreases, the voltage of the error signal Vop increases, the pulse width of the first control signal DH having an H level widens, and the ON time of the first transistor T1 lengthens. As the first voltage V1 increases, the voltage of the error signal Vop decreases, the pulse width of the first control signal DH having an H level narrows, and the ON time of the first transistor T1 shortens. Both output transistors T1 and T2 are controlled so that such operation equalizes the voltage V1 and the reference voltage Vr1 match to keep the first voltage V1 constant.

Since the DAC 41 outputs the reference voltage Vr1 corresponding to the set value stored in the first register 32a, the first converter 31a outputs the first voltage V1 corresponding to the set value of the first register 32a.

In the same manner as the first converter 31a, the second converter 31b includes a DAC 41 and a converter circuit 42a. The DAC 41 outputs voltage (reference voltage) Vr2 corresponding to the set value stored in the second register 32b. Therefore, the second converter 31b outputs the second voltage V2 corresponding to the set value of the second register 32b in the same manner as the first converter 31a.

The third converter 31c includes a DAC 41 and a converter circuit 42b. The converter circuit 42b includes an error amplifier (ERA) 51, a PWM comparator 52, an oscillator (OSC) 53, transistors T1 and T2, a choke coil L1, and a smoothing capacitor C1. Reference voltage Vr3 from the DAC 41 is supplied to a non-inverting input terminal of the error amplifier 51. The third voltage V3 is supplied to the inverting input terminal of the error amplifier 51. The error amplifier 51 amplifies the difference between the reference voltage Vr3 and the third voltage V3 to generate an error signal Vop having the voltage obtained by amplifying the difference. The error signal Vop and a triangular wave signal Sr generated by the oscillator 53 are provided to the PWM comparator 52. The PWM comparator 52 compares the error signal Vop and the triangular wave signal Sr to output a first control signal DH having a level corresponding to the comparison result and a second control signal DL having a level inverted from the first control signal. For example, the PWM comparator 52 outputs the first control signal DH having an L level and the second control signal DL having an H level when the voltage of the error signal Vop is higher than the voltage of the triangular wave signal Sr. On the other hand, the PWM comparator 52 outputs the first control signal DH having an H level and the second control signal DL having an L level when the voltage of the error signal Vop is lower than the voltage of the triangular wave signal Sr. The first control signal DH is provided to the first transistor T1, and the second control signal DL is provided to the second transistor T2.

The first transistor T1 and the second transistor T2 are N-channel MOS transistors. The input voltage Vin is applied to the drain of the first transistor T1. The source of the first transistor T1 is connected to a first terminal of the choke coil L1. The choke coil L1 has a second terminal connected to ground. The second transistor T2 has a first terminal, which is connected to a node between the first transistor T1 and the choke coil L1, and a second terminal (output terminal), which is connected to a first terminal of the capacitor C1 and the inverting input terminal of the error amplifier 51. The capacitor C1 has a second terminal connected to ground. The second control signal DL is provided to the gate of the second transistor T2. The second terminal of the second transistor T2 outputs the third voltage V3.

The DAC 41 of the third converter 31c outputs the reference voltage Vr3 corresponding to the set value stored in the third register 32c. Therefore, the third converter 31c outputs the third voltage V3 corresponding to the set value of the third register 32c in the same manner as the first converter 31a.

Referring back to FIG. 2, the first power supply communication circuit 22 is provided with a function for communicating with the first main unit communication circuit 12, a function for controlling the DC-DC converter 23 that functions as the second voltage generation circuit, and a function for setting the initial value data to each register 32a to 32c. The first power supply communication circuit 22 activates the DC-DC converter 23 when the system power supply unit 20 is supplied with the external voltage Vin. The DC-DC converter 23 outputs a predetermined initial operational voltage V0. The first main unit communication circuit 12 and the memory circuit 13 are operated by the initial operational voltage V0, and the first main unit communication circuit 12 transmits the initial value data read from the memory circuit 13. The first power supply communication circuit 22 inactivates the DC-DC converter 23 when receiving the initial value data. Since the DC-DC converter 23 is inactivated, the initial operational voltage V0 is not supplied to the first main unit communication circuit 12 and the memory circuit 13. Thus, the first main unit communication circuit 12 and the memory circuit 13 do not operate. Therefore, since the first main unit communication circuit 12, the memory circuit 13, and the DC-DC converter 23 are inactivated after receiving the initial value data, the power consumption is reduced accordingly.

The first power supply communication circuit 22 sets the set values complying with the received initial value data for each of the first to third registers 32a to 32c. The system power supply unit 20 supplies the system main unit 10 with the first to the third voltages V1 to V3 corresponding to the set values, and the system main unit 10 is operated by the first to the third voltages V1 to V3 corresponding to the initial value data.

To supply voltage that is suitable for the operation of the system main unit, for example, high or low voltage (voltage that is not suitable for operation) may be supplied to the system main unit and the voltage may then be changed in accordance with the operation that is to be performed. In this case, however, the voltage, which is not suitable for the operation and supplied first, may cause erroneous operation of the system main unit. In the preferred embodiment, the system power supply unit 20 supplies the system main unit 10 with the first to the third voltages V1 to V3 (voltage suitable for operation) corresponding to the initial value data of the system main unit 10. Thus, the system main unit 10 will not operate erroneously.

The second power supply communication circuit 24 is provided with a function for communicating with the second main unit communication circuit 15 and a function for setting the set values in each register 32a to 32c. The second power supply communication circuit 24 receives the set data from the second main unit communication circuit 15. Subsequently, the second power supply communication circuit 24 sets the set values complying with the received set data to each of the first to third registers 32a to 32c in the same manner as the first power supply communication circuit 22. That is, the set values (initial set values) set in the first to the third registers 32a to 32c by the first power supply communication circuit 22 are updated by the set values (updating set values or feedback set values) of the second power supply communication circuit 24. The converters 31a to 31c generate and output the first to the third voltages V1 to V3 corresponding to the set values set in the respective register 32a to 32c. Thus, even if the operational environment of the system main unit 10 change, the set values of the registers 32a to 32c are accordingly changed to change the first to the third voltages V1 to V3. Thus, the load 11 operates at a predetermined speed.

The preferred embodiment has the advantages described below.

(1) The system main unit 10 includes the memory circuit 13, which stores the initial value data that sets the operational voltage of the load 11, and a main unit communication circuit 12, which reads the initial value data from the memory circuit 13 and transmits the initial value data. The system power supply unit 20 includes the power supply communication circuit 22, which communicates with the main unit communication circuit to receive the initial value data, and the voltage generation circuit 21, which generates voltage in accordance with the set value set based on the initial value data. The system power supply unit 20 receives the initial value data that is in accordance with manufacturing variations of the system main unit 10. Thus, the system power supply unit 20 supplies the load 11 of the system main unit 10 with voltage corresponding to the initial value data. Accordingly, the load 11 operates with the desired operational property.

(2) The system power supply unit 20 includes the DC-DC converter 23 for supplying the main unit communication circuit 12 with the initial operational voltage V0. Only the main unit communication circuit 12 and the memory circuit 13 are operated when reading the initial value data. Since the initial operational voltage V0 only needs to enable the reading of the initial value data, the initial operational voltage V0 does not need to be accurately controlled. Thus, the initial operational voltage V0 supplied to the main unit communication circuit 12 and the memory circuit 13 is generated with a simple configuration.

(3) The power supply communication circuit 22 inactivates the DC-DC converter 23 after receiving the initial value data. Thus, the power consumption of the electronic device 100 is reduced by an amount corresponding to the power consumption of the main unit communication circuit 12, the memory circuit 13, and the DC-DC converter 23.

(4) The memory circuit 13 stores the initial value data including a plurality of set values respectively corresponding to the plurality of voltages required by the load 11. The voltage generation circuit 21 includes the plurality of registers 32a to 32c respectively holding the plurality of set values, and the plurality of DC-DC converters 31a to 31c respectively generating the plurality of voltages based on the plurality of set values. Therefore, the voltages corresponding to the set values are supplied from the DC-DC converters 31a to 31c to the load 11 by storing the set values in the registers 32a to 32c.

(5) The voltage generation circuit 21 includes the plurality of DA converters 41 respectively outputting the reference voltages Vr1 to Vr3 corresponding to the initial value data to control the output voltage based on the reference voltage. The setting and changing of the plurality of output voltages are easily performed by changing the output voltages of the DA converters 41.

(6) The system main unit 10 includes the monitor circuit, which measures the operational property of the load 11 and generates the set value data of the voltage supplied to the load 11 in accordance with the measurement result, and the second communication circuit, which transmits the set value data. The system power supply unit 20 includes the second communication circuit for receiving the set value data. The voltage generation circuit 21 controls the output voltage based on the set data. Therefore, even if the operational property changes due to operational changes in the load 11, the operational property is detected and the voltage supplied to the load 11 is changed by the monitor circuit. This operates the load 11 with the desired operational property.

(7) A plurality of the system bodies 10 are connected to the system power supply unit 20. Further, the first power supply communication circuit 22 stores the initial value data of each system main unit 10 received from the first main unit communication circuit 12 of the system bodies 10 in each register of the voltage generation circuit 21. Therefore, the voltages are supplied to the plurality of system bodies 10 from one system power supply unit 20. Even if the system main unit 10 is changed, voltage that is in accordance with the system main unit 10 is supplied by reading the initial value data of the system main unit 10 and storing it in the register.

It should be apparent to those skilled in the art that the present invention may be embodied in many other specific forms without departing from the spirit or scope of the invention. Particularly, it should be understood that the present invention may be embodied in the following forms.

Figure 4:
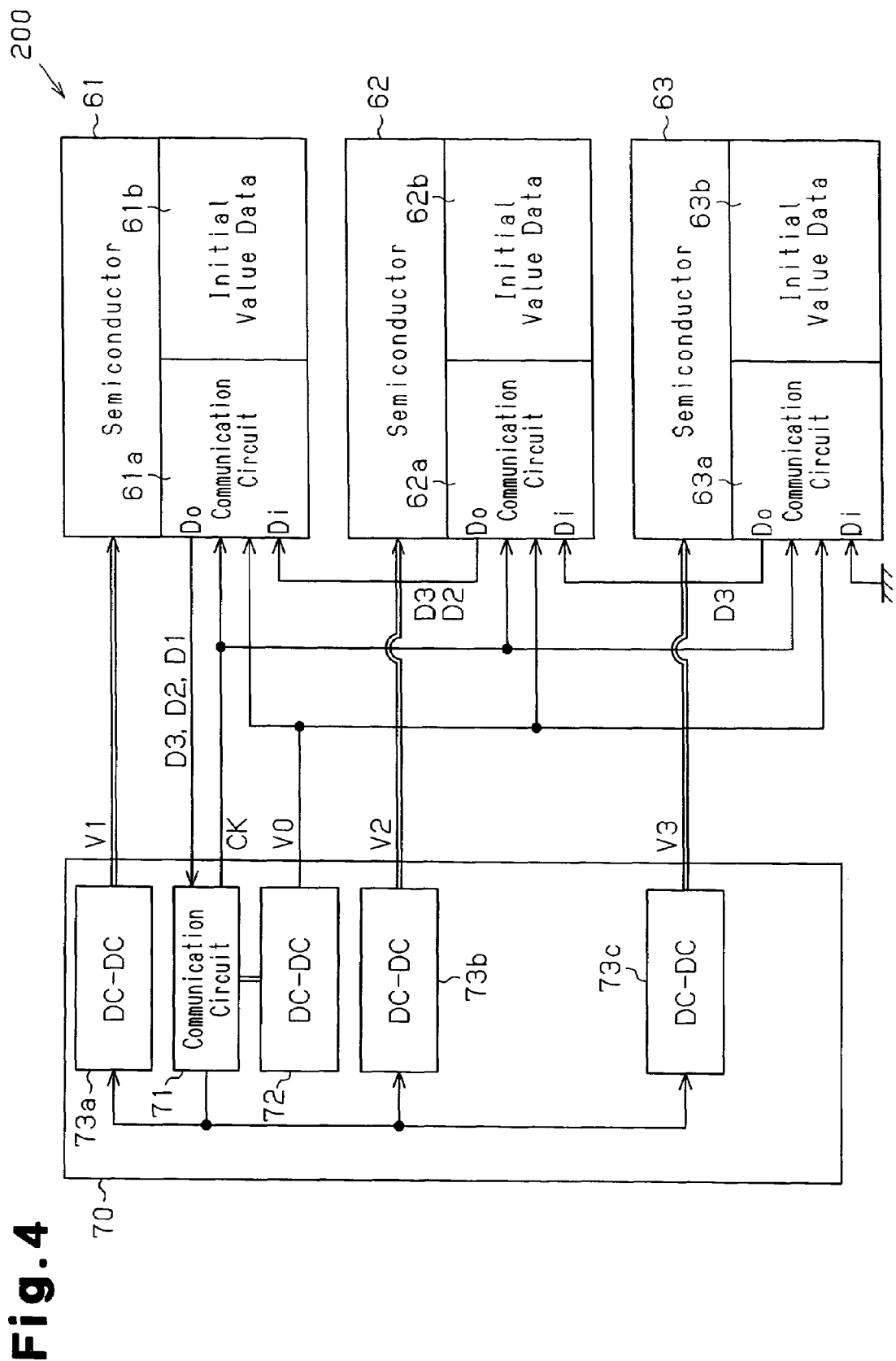
FIG. 4 is a block diagram of an electronic device according to a further embodiment of the present invention.

In the preferred embodiment, the electronic device 100 incorporates one system power supply unit 20 for supplying a plurality of voltages V1 to V3 to one system main unit 10. However, as shown in FIG. 4, an electronic system 200 may include a plurality of (three in FIG. 4) system bodies 61 to 63, as shown in FIG. 4. The system bodies 61 to 63 are semiconductor integrated circuit devices respectively including communication circuits 61a to 63a and memory circuits 61b to 63b for storing the initial value data. The communication circuit 61a to 63a of each system main unit 61 to 63 is cascade-connected. More specifically, in FIG. 4, the third communication circuit 63a has an input terminal Di connected to ground and an output terminal Do connected to an input terminal Di of the second communication circuit 62a. The second communication circuit 62a further has an output terminal Do connected to an input terminal Di of the first communication circuit 61a. The first communication circuit 61a has an output terminal Do connected to a communication circuit 71 of a system power supply unit 70. A clock signal CK is provided to the communication circuits 61a to 63a of the system bodies 61 to 63 as a signal for reading data from the communication circuit 71 of the system power supply unit 70.

The communication circuit 71 of the system power supply unit 70 activates the DC-DC converter 72 when supplied with the voltage Vin as the external voltage, and the DC-DC converter 72 outputs a predetermined initial operational voltage V0. The communication circuit 71 then outputs the clock signal CK. The first to the third communication circuits 61a to 63a are operated by the initial operational voltage V0 to read the initial value data from the associated memory circuits 61b to 63b. The initial value data read by the first to the third communication circuits 61a to 63a are hereinafter referred to as first to third data D1 to D3.

The third communication circuit 63a, of which the input terminal Di is connected to ground, outputs the third data D3 to the second communication circuit 62a in synchronization with the clock signal CK. The second communication circuit 62a outputs the second data D2 following the third data D3, which is provided from the third communication circuit 63a, to the first communication circuit 61a. The first communication circuit 61a outputs the first data D1 following the third data D3 and the second data D2 to the communication circuit 71 of the system power supply unit 70. That is, the third to the first data D3 to D1 of the system bodies 61 to 63 are sequentially provided to the communication circuit of the system power supply unit 70. The segments of data D3 to D1 are each identified by the number of bytes or the delimiter of the data. The communication circuit 71 sets the third to the first data D3 to D1 to the registers (not shown) corresponding to the third converter 73c, the second converter 73b, and the first converter 73a in accordance with the input order.

Accordingly, in the electronic system 200 in which the plurality of system bodies 61 to 63 are connected to the system power supply unit 70, the communication procedure is simple, and the communication time is shorter than when communicating individually since the reading of data D1 to D3 does not need to be performed separately for each of the system bodies 61 to 63. Thus, the initial values of the converters 73a to 73c is set and the appropriate voltages V1 to V3 are supplied respectively system main unit 61 to 63 within a short period of time from when the electronic system 200 is activated.

A start signal instructing the starting of communication may be output to each of the system bodies 61 to 63 instead of the clock signal CK.

When a plurality of the system bodies 61 to 63 are connected as described above, a monitor circuit may be provided for each of the system bodies 61 to 63, and the voltages V1 to V3 supplied to the system bodies 61 to 63 may be controlled based on the result of the monitor circuit. In this case, the second communication circuit is arranged in each of the system bodies 61 to 63 and the system power supply unit 70, and the result of the monitor circuit is transmitted to the second communication circuit of the system power supply unit 70 via the second communication circuit of the system bodies 61 to 63 to set each of the converters 73a to 73c. Furthermore, the result of the monitor circuit may be transmitted to the communication circuit 71 of the system power supply unit 70 via the communication circuits 61a to 63a of the system bodies 61 to 63, and the communication circuit 71 may set each of the converters 73a to 73c.

The initial value data may contain information such as the order for applying or cutting the voltages V1 to V3.

In the preferred embodiment, the monitor circuit 14 generates the set data including the set values of the voltages V1 to V3. However, the set data is not limited in such a manner. For example, the set data may be the amount of change for increasing or decreasing the voltages V1 to V3, the ratio between the current value and the changed value, or simply an instruction for increasing or decreasing the voltage. Furthermore, the set values of one of the voltages V1 to V3, for example, the first voltage V1 may be used as a reference to calculate the second voltage V2 and the third voltage V3 relative to the first voltage V1. Further, the set data may contain information for changing the first voltage V1.

In the preferred embodiment, the first DC-DC converter 31a and the second DC-DC converter 31b output a positive voltage, and the third DC-DC converter 31c outputs a negative voltage. However, the combination of the DC-DC converters is not limited in such a manner. For example, all of the DC-DC converters may output either the positive voltage or the negative voltage. Alternatively, the voltage generation circuit that is employed may be configured by voltage step-down and voltage step-up DC-DC converters.

In the preferred embodiment, the communication path between the first main unit communication circuit 12 and the first power supply communication circuit 22 is separate from the communication path between the second main unit communication circuit 15 and the second power supply communication circuit 24. However, a common communication path may be used instead. In this case, the number of terminals for connecting the system main unit 10 and the system power supply unit 20 is reduced.

In the preferred embodiment, the main unit communication circuit 12 and the memory circuit 13 are operated by the initial operational voltage V0 supplied from the system power supply unit 20. However, the main unit communication circuit 12 and the memory circuit 13 may be operated by initial operational voltage supplied from another power supply or initial operational voltage generated in the system main unit 10. In this case, in the same manner as the preferred embodiment, the initial operational voltage does not have to be accurate as long as data of the memory circuit 13 is accessible since the operational property of the main unit communication circuit 12 and the memory circuit 13 may vary. In this case, the system power supply unit 20 also performs communication directly with the first main unit communication circuit 12 or indirectly with the first main unit communication circuit 12 by way of the second main unit communication circuit 15 to read the initial value data from the memory circuit 13. The initial value data may also be written.

The present examples and embodiments are to be considered as illustrative and not restrictive, and the invention is not to be limited to the details given herein, but may be modified within the scope and equivalence of the appended claims.

What is claimed is:

1. An electronic device comprising:
a system unit including a load powered by an operational voltage; and a power supply unit connected to the system unit to supply the load with the operational voltage;

the system unit including:

a memory circuit adapted to store a set value for setting the operational voltage; and a first communication circuit adapted to read the set value from the memory circuit and to transmit the set value to the power supply unit after an initial operational voltage is supplied; and the power supply unit including:

a second voltage generation circuit adapted to supply the memory circuit and the first communication circuit with the initial operational voltage for operating the memory circuit and the first communication circuit;

a second communication circuit adapted to receive the set value from the first communication circuit; and a first voltage generation circuit adapted to supply the system unit with a voltage corresponding to the set value as the operational voltage.

2. The electronic device according to claim 1, wherein the second voltage generation circuit is deactivated after receiving the set value.

3. The electronic device according to claim 1, wherein:

the load is powered by a plurality of voltages;

the memory circuit stores a plurality of set values respectively corresponding to the plurality of voltages; and the voltage generation circuit includes:

a plurality of registers adapted to respectively hold the plurality of set values; and a plurality of DC-DC converters connected to the plurality of registers to respectively generate the plurality of voltages in accordance with the plurality of set values.

4. The electronic device according to claim 3, wherein the plurality of DC-DC converters each include a DA converter adapted to output a reference voltage that is in accordance with the corresponding set value, and the plurality of DC-DC converters respectively adjust the plurality of voltages based on the plurality of reference voltages to output a plurality of adjusted voltages.

5. The electronic device according to claim 1, wherein:

the system unit includes:

a monitor circuit adapted to measure an operational property of the load to generate a plurality of new set values corresponding to the measurement result; and a third communication circuit connected to the monitor circuit to transmit the plurality of new set values; and the power supply unit includes:

a fourth communication circuit adapted to receive the plurality of new set values, with the voltage generation circuit adjusting the plurality of voltages in accordance with the plurality of new set values to output a plurality of adjusted voltages.

6. The electronic device according to claim 1, wherein:

the system unit is one of a plurality of system bodies, each including a set value and connected to the power supply unit; and the second communication circuit receives a plurality of set values of the plurality of system bodies and stores the plurality of set values in a plurality of registers of the voltage generation circuit, respectively.

7. The electronic device according to claim 6, wherein:

the plurality of system bodies include a plurality of first communication circuits;

the second communication circuit and the plurality of first communication circuits are cascade-connected;

an upstream one of the plurality of first communication circuits located near the second communication circuit receives the set value from a downstream one of the first communication circuits distant from the second communication circuit; and the second communication circuit receives all of the set values of the plurality of system main bodies from a most upstream one of the first communication circuits.

8. The electronic device according to claim 1, wherein the memory circuit stores the set value that is set so as to compensate for variations in an operational property of the load resulting from processing variations during manufacturing.

9. The electronic device according to claim 1, wherein the second voltage generation circuit supplies the initial operational voltage exclusively to the memory circuit and the communication circuit.

10. The electronic device according to claim 1, wherein the second voltage generation circuit starts supplying the initial operational voltage to the memory circuit and the communication circuit before the first voltage generation circuit starts supplying the system unit with the voltage corresponding to the set value.

11. A power supply unit for use with a system unit including a load to supply an operational voltage to the load, the system unit including a memory circuit storing a set value for setting the operational voltage, and a first communication circuit adapted to read the set value from the memory circuit to transmit the set value to the power supply unit after an initial operational voltage is supplied, the power supply unit comprising:

a second voltage generation circuit adapted to supply the memory circuit and the first communication circuit with the initial operational voltage for operating the memory circuit and the first communication circuit:

a second communication circuit adapted to receive the set value from the first communication circuit; and a first voltage generation circuit adapted to supply the system unit with a voltage corresponding to the set value as the operational voltage.

12. The power supply unit according to claim 11, wherein the second voltage generation circuit is inactivated after receiving the set value.

13. The power supply unit according to claim 11, wherein:

the load is operated by a plurality of voltages;

the memory circuit stores a plurality of set values respectively corresponding to the plurality of voltages; and the voltage generation circuit includes:

a plurality of registers to respectively hold the plurality of set values; and a plurality of DC-DC converters connected to the plurality of registers to respectively generate the plurality of voltages in accordance with the plurality of set values.

14. The power supply unit according to claim 13, wherein the plurality of DC-DC converters each include a DA converter to output a reference voltage that is in accordance with a corresponding set value, and the plurality of DC-DC converters respectively adjust the plurality of voltages based on the plurality of reference voltages to output a plurality of adjusted voltages.

15. The power supply unit according to claim 11, wherein the system unit includes a monitor circuit adapted to measure an operational property of the load to generate a plurality of new set values corresponding to the measurement result, and a third communication circuit connected to the monitor circuit to transmit the plurality of new set values, the power supply unit further comprising:

a fourth communication circuit to receive the plurality of new set values, with the voltage generation circuit adjusting the plurality of voltages in accordance with the plurality of new set values to output a plurality of adjusted voltages.

16. The power supply unit according to claim 11, wherein:
the system unit is one of a plurality of system bodies, each including set value and connected to the power supply unit; and
the second communication circuit receives a plurality of set values of the plurality of system bodies and stores the plurality of set values in a plurality of registers of the voltage generation circuit, respectively.

17. The power supply unit according to claim 16, wherein:
the plurality of system bodies include a plurality of first communication circuits;
the second communication circuit and the plurality of first communication circuits are cascade-connected when the power supply unit is connected to the plurality of system bodies; and
the second communication circuit receives all of the set values of the plurality of system main bodies from a most upstream one of the first communication circuits.

18. A method for supplying an operational voltage from a power supply unit to a load of a system unit connected to the power supply unit, the method comprising:
storing a set value for setting an operational voltage in a memory circuit of the system unit;
supplying from a second voltage generation circuit of the power supply unit to the memory circuit and a first communication circuit of the system unit with an initial operational voltage for operating the memory circuit and the first communication circuit;
reading the set value stored in the memory circuit to transmit the set value via the first communication circuit to a second communication circuit of the power supply unit;
receiving the set value at the second communication circuit of the power supply unit;
supplying a voltage corresponding to the set value as the operational voltage from the power supply unit; and
decreasing supply of the initial voltage to the memory circuit and the first communication circuit of the system unit after the power supply unit receives the set value from the system unit.

19. The method according to claim 18, wherein the decreasing includes stopping the supply of the initial operational voltage to the memory circuit and the first communication circuit after receiving the set value.

20. The method according to claim 18, wherein the load is operated by a plurality of voltages, and the memory circuit stores a plurality of set values respectively corresponding to the plurality of voltages, the method further comprising:
holding the plurality of set values with the power supply unit; and
generating the plurality of voltages in accordance with the plurality of set values with a plurality of DC-DC converters of the power supply unit.

21. The method according to claim 20, further comprising:
outputting a plurality of reference voltages respectively in accordance with the plurality of set values; and
adjusting the plurality of voltages respectively based on the plurality of reference voltages to output a plurality of adjusted voltages.

22. The method according to claim 18, further comprising:
measuring an operational property of the load with the system unit and generating a plurality of new set values corresponding to the measurement result;
transmitting the plurality of new set values from the system unit to the power supply unit; and
adjusting the plurality of voltages with the power supply unit in accordance with the plurality of new set values and outputting a plurality of adjusted voltages.

23. The method according to claim 18, wherein the system unit is one of a plurality of system bodies, each including set value and connected to the power supply unit, the method further comprising:
storing a plurality of set values of the plurality of system bodies with the memory circuit of the power supply unit.

24. The method according to claim 23, wherein the plurality of system bodies include a plurality of cascade-connected first communication circuits, and the power supply unit includes the power supply communication circuit connected to a most upstream one of the first communication circuits, the method further comprising:
receiving all of the set values of the plurality of system main bodies from the most upstream one of the first communication circuits with the second communication circuit.

* * * * *